United States Patent [19]
Barlow et al.

[11] Patent Number: 5,099,420
[45] Date of Patent: Mar. 24, 1992

[54] METHOD AND APPARATUS FOR LIMITING THE UTILIZATION OF AN ASYNCHRONOUS BUS WITH DISTRIBUTED CONTROLLED ACCESS

[75] Inventors: George J. Barlow, Tewksbury; John W. Bradley; Edward F. Getson, Jr., both of Peabody, all of Mass.

[73] Assignee: Bull HN Information Systems Inc., Billerica, Mass.

[21] Appl. No.: 295,639

[22] Filed: Jan. 10, 1989

[51] Int. Cl.⁵ .................... G06F 9/00; G06F 13/36
[52] U.S. Cl. .......................... 395/325; 364/240.5; 364/DIG. 1
[58] Field of Search .......... 364/240.5; 370/85; 340/825.5

[56] References Cited

U.S. PATENT DOCUMENTS

| | | | |
|---|---|---|---|
| 4,519,031 | 5/1985 | Magar et al. | 364/200 |
| 4,558,429 | 12/1985 | Barlow et al. | 364/900 |
| 4,719,567 | 1/1988 | Whittington et al. | 364/200 |

Primary Examiner—Salvatore Cangialosi
Attorney, Agent, or Firm—Faith F. Driscoll; John S. Solakian

[57] ABSTRACT

A plurality of units which are coupled to transfer requests, transfer data over an asynchronous bus network during allocated bus transfer cycles. The network has a tie-breaking bus priority network which is distributed to a common interface portion of each of the plurality of units and grants bus cycles and resolves simultaneous requests on a priority basis. At least one unit includes bus saturation detection apparatus included within its common interface portion for monitoring bus activity over established intervals of time. The detection of the occurrence of at least one available cycle over the given interval of time signals that the bus network is not in a saturated state. When the indicator specifies that the bus network is saturated, the unit throttles down its operation by increasing the amount of time between issuing data requests. Throttling continues until the bus is no longer being saturated.

24 Claims, 6 Drawing Sheets

METHOD AND APPARATUS FOR LIMITING THE UTILIZATION OF AN ASYNCHRONOUS BUS WITH DISTRIBUTED CONTROLLED ACCESS

RELATED PATENT APPLICATIONS

1. The patent application of Edward F. Getson, Jr., John W. Bradley, Joseph P. Gardner and Alfred F. Votolato entitled, "Controller Having an EEPROM Firmware Store," Ser. No. 07/295,318, filed on Jan. 10, 1989, which is assigned to the same assignee as this patent application.

2. The patent application of Edward F. Getson, Jr., John W. Bradley, Joseph P. Gardner and Alfred F. Votolato entitled, "Multiprocessor Controller Having Shared Control Store," Ser. No. 07/295,629 filed on Jan. 10, 1989, which is assigned to the same assignee as this patent application.

3. The patent application of Edward F. Getson, Jr., John W. Bradley, Joseph P. Gardner and Alfred F. Votolato entitled, "Peripheral Controller with Paged Data Buffer Management," issued as U.S. Pat. No. 4,888,727 on Dec. 19, 1989 which is assigned to the same assignee as this patent application.

BACKGROUND OF THE INVENTION

1. Field of Use

This invention pertains to data processing systems in which a system bus network is shared by a plurality of units and more particularly to a method and apparatus for limiting the use of such system bus network.

2. Prior Art

In many data processing systems, a bus network is frequently used to interconnect the different elements together. In certain types of these systems, the access of one or more master controllers to the bus network is controlled through a single bus arbitration module which grants access to the master controllers on a priority basis. The bus master granted access performs the specified request which, in certain instances, involves the performance of burst type transfers. Depending upon the types of requests being performed by the plurality of master controllers, the system's central processing unit, normally granted low priority, has been effectively precluded from using the bus network.

To prevent this, the system disclosed in U.S. Pat. No. 4,719,567 includes apparatus within the bus master controller which limits its activity during a particular time interval based upon the bus activity during a preceding time interval. However, the arrangement requires a centralized arrangement which operates in a synchronous manner. Also, the arrangement determines the activity of the bus by dividing the activity of the bus master controller into a succession of sample intervals comprising a selected number of clock cycles of the bus master controller. During each such sample interval, the bus master controller determines the utilization rate of the bus network as the ratio of the number of clock cycles during which the grant acknowledge signal of such controller is active to the number of clock cycles comprising the sample interval. If the utilization rate of the bus network during a particular sample interval is determined to be above a selected threshold, the bus master controller is prevented from arbitrating for the use of the bus network during the next successive sample interval. If the utilization rate is determined to be below the predetermined threshold, the bus master controller will be allowed to contend for the right to use the bus network. This form of measurement involving measuring ratios of intervals has been found somewhat ineffective in that it reduces system performance.

Also, the system of U.S. Pat. No. 4,558,428 is of interest in that it discloses how a high priority unit, such as a memory controller, during the execution of a burst type transfer operation which could saturate an asynchronous bus network, is able to skip a cycle of the burst type transfer operation, enabling a lower priority unit access to the memory controller's memory. While this arrangement improves overall system performance by enabling a lower priority unit access to memory, during a burst type transfer, it does not prevent the bus network from being saturated by other units competing for bus network access.

Accordingly, it is a primary object of the present invention to provide a method and apparatus for limiting the utilization of an asynchronous bus system by a user bus unit.

It is a more specific object of the present invention to provide a method and apparatus for limiting access to an asynchronous bus network by any one of a plurality of units connected to the network which are granted access by priority logic network distributed among such units.

SUMMARY OF THE INVENTION

The above and other objects of the present invention are achieved by the preferred embodiment which includes a plurality of units which are coupled to transfer requests, and data over an asynchronous bus network during allocated bus transfer cycles. Each unit has a common interface portion which includes bus request circuits and response circuits for acknowledging requests received from other units.

A tie-breaking bus priority network is distributed to the common interface portion of each of the plurality of units which grants bus cycles and resolves simultaneous requests on a priority basis. In general, priority is granted on the basis of the unit's physical position on the bus network. In the system of the preferred embodiment, the highest priority is given to the system's memory subsystem and the lowest priority to the system's central processing unit with the other units being positioned on the basis of their performance requirements.

According to the teachings of the present invention, at least one unit, such as a disk type peripheral controller subsystem, includes bus saturation detection apparatus within the common interface portion for monitoring bus activity. Activity is monitored by detecting the absence of unused bus cycles occurring over a given interval of time. The detection of the occurrence of one or more available cycles over the given interval of time is used to signal that the bus network is not in a saturated state. However, when the presence of at least one unused or available bus cycle is not detected, this signals that the bus network is saturated.

In more particular terms, the peripheral controller subsystem includes a microprogrammed processor which sets an indicator within the bus saturation detection apparatus to a predetermined state under microprogram control at the beginning of a transfer interval. The detector monitors the state of at least one predetermined signal utilized by the bus priority network for determining the extent of bus utilization. The detector apparatus switches the state of its indicator upon detecting the occurrence of an unused or available cycle. The output of the detector indicator is provided to branch test circuits included within the processor. At the end of the transfer interval, the subsystem tests the state of the saturation detector indicator. If the detector indicator specifies that the bus is not saturated, it resets the state of the indicator and begins another interval.

This process continues with the peripheral controller periodically clearing the state of the saturation detector indicator and determining if it is still in the predetermined state. When the indicator specifies that the bus network is saturated, the peripheral subsystem throttles down its operation by increasing the amount of time between issuing requests. In the preferred embodiment, this is accomplished by adding or incrementing a "wait count value."

Additionally, the processor can also adjust its operation by altering or changing its priority from high to low as a function of the results of testing for bus saturation. Thus, processor can be easily programmed for maintaining a desired transfer rate required for efficient operation.

The novel features which are believed to be characteristic of the invention both as to its organization and method of operation, together with further objects and advantages, will be better understood from the following description when considered in connection with the accompanying drawings. It is to be expressly understood, however, that each of the drawings is given for the purpose of illustration only and is not intended as a definition of the limits of the present invention.

DESCRIPTION OF SYSTEM OF FIG. 1

Figure 1:
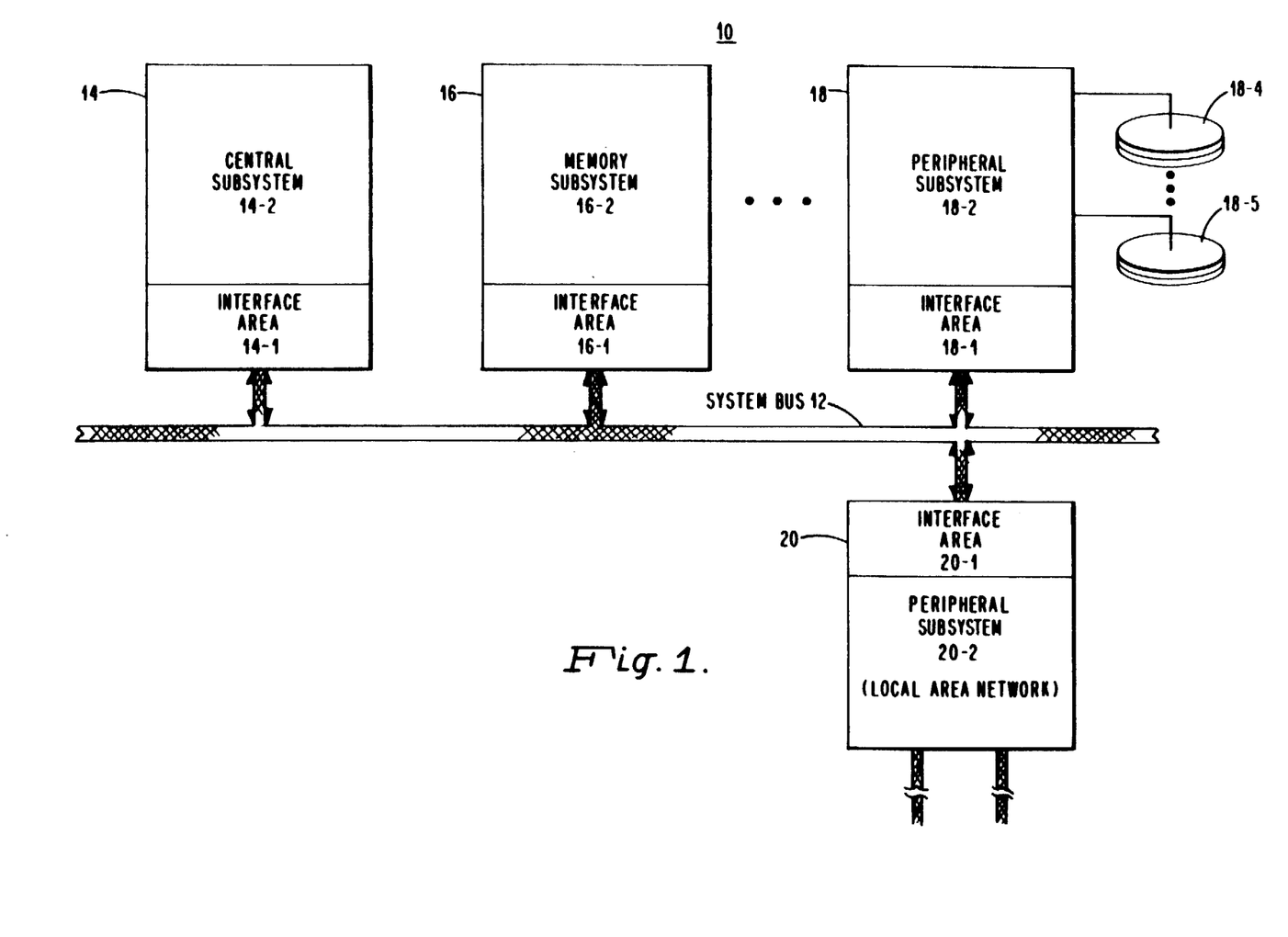
FIG. 1 is a block diagram of a data processing system which includes the apparatus of the present invention.

FIG. 1 shows a data processing system 10 which includes a plurality of subsystems 14 through 20 which couple in common to an asynchronous system bus network 12. The illustrative subsystems include a central subsystem 14, a memory subsystem 16, a disk peripheral subsystem 18 and a local area network subsystem 20. Each subsystem includes an interface area which enables the unit or units associated therewith to transmit or receive requests in the form of commands, interrupts, data or responses/status to or from another unit on the system bus 12 in an asynchronous manner.

By way of illustration, only four subsystems are shown in FIG. 1. However, the data processing system 10 normally includes additional subsystems for connecting a full complement of peripheral devices, other processing units and communication devices to system bus 12. While each of the interface areas of the peripheral subsystems can include the apparatus of the present invention, it will be assumed that only interface 18-1 of subsystem 18 includes such apparatus. Therefore, only subsystem 18 will be described in detail herein with reference to FIG. 2.

DESCRIPTION OF PERIPHERAL SUBSYSTEM 18

Figure 2:
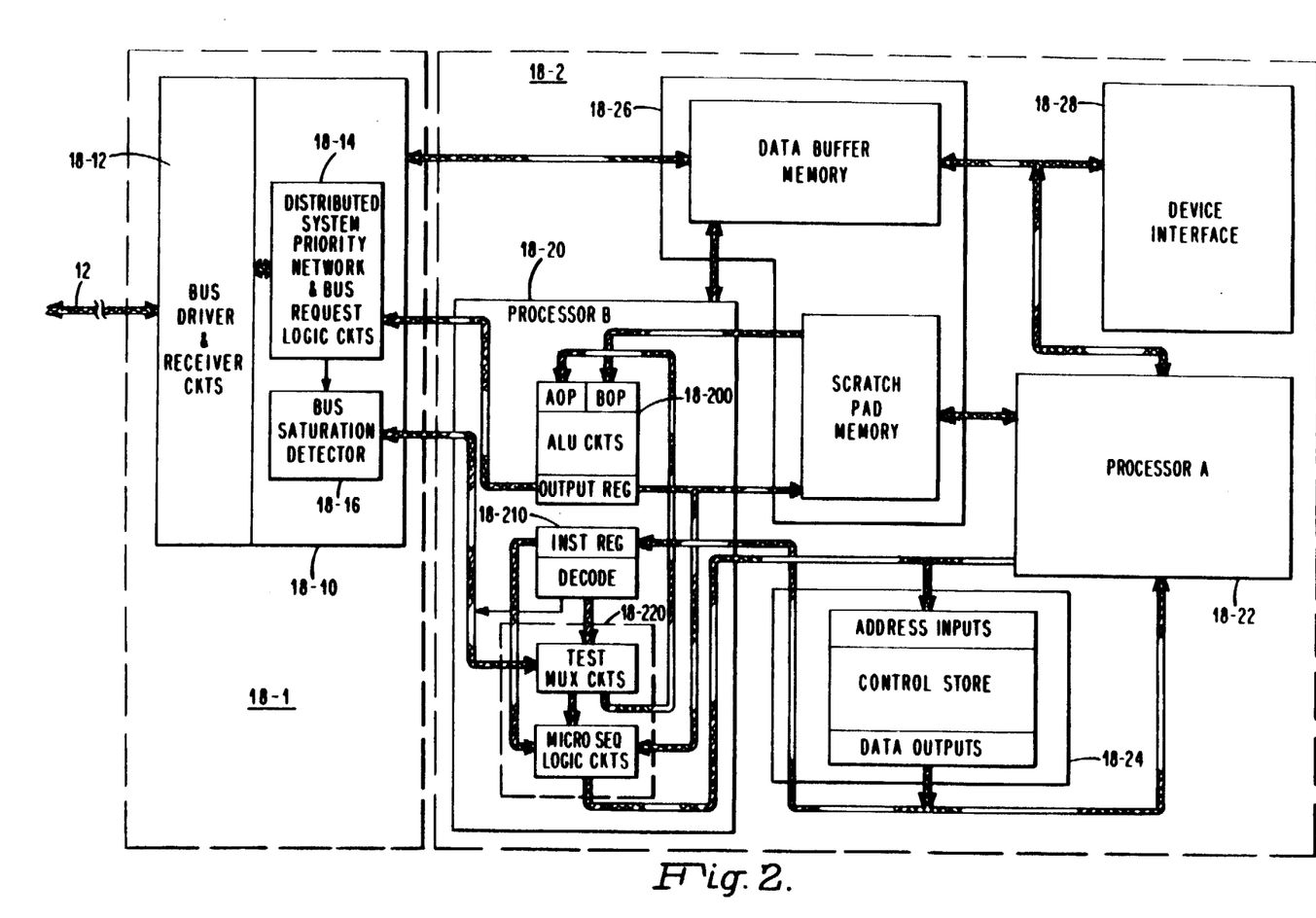
FIG. 2 shows in greater detail, the peripheral subsystem of FIG. 1 which includes the apparatus of the present invention.

Referring to FIG. 2, it is seen that disk peripheral subsystem interface area 18-01 includes a section 18-10 which includes the bus driver and receiver circuits of block 18-12, the distributed system priority network and bus request logic circuits of block 18-14 and the bus saturation detector circuit of block 18-16. The circuits of block 18-14 and 18-16 couple to system bus 12 via the driver and receiver circuits of block 18-12.

The peripheral subsystem 18-2 includes a pair of processors 18-20 and 18-22 which operate under the control of sequences of microinstructions stored in a control store unit 18-24. The processor 18-20 handles those tasks involving the subsystem-system bus interface, such as transfers commands, data, etc., while processor 18-22 handles those tasks involving the subsystem-device interface. Both processors share a scratchpad memory and data buffer memory included as part of the subsystem memory unit 18-26. The scratchpad memory includes register locations used for storing device parameter information in addition to providing temporary storage for control and data handling operations (e.g. status and address information). The data buffer memory stores different blocks of data bytes being transferred across both the system and device interfaces.

The peripheral subsystem 18-2 also includes the device interface circuits of block 18-28. These circuits establish an interface with the disk storage devices 18-4 and 18-5 of FIG. 1 for controlling device operations and generating the required dialog sequences over the associated device level interface. In a preferred embodiment, the device level interface is a SCSI device. This type of interface is described in an article entitled, "Adding SCSI to the SB180 Computer, Part I: Introduction" by Steve Ciarcia, published in the May 1986 issue of Byte magazine. For further information regarding the operation of the different blocks of FIG. 2, reference may be made to the copending related patent applications.

The details of processor 18-20 will only be described to the extent necessary to understand how it utilizes the method and apparatus of the present invention. Briefly, processor 18-20 includes an ALU section 18-200, an instruction register and decode section 18-210, and a test multiplexer and microsequencer logic section 18-220. The ALU section 18-200 is capable of performing logical and arithmetic operations on A and B operand signals received from several sources including scratchpad memory and section 18-220. These operations are performed under control of microinstructions loaded into an instruction register of section 18-210 from control store 18-24. The ALU, after performing the specified operation, delivers the result via an output register to several units including scratchpad memory and to the bus request logic circuits of interface 18-10.

The instruction register and decode section 18-210, as shown, includes the instruction register for storing each microinstruction read out from control store 18-24, during a processor cycle of operation. The different fields are decoded and applied as inputs to a number of test multiplexer circuits which, in the case of certain types of microinstructions (e.g. branch), enable the microsequencer logic circuits to generate the address of the next microinstruction to be read out of control store 18-24. Certain portions of these circuits will be described in greater detail relative to FIG. 3b.

DETAILED DESCRIPTION OF FIG. 2 CIRCUITS

Figure 3A:
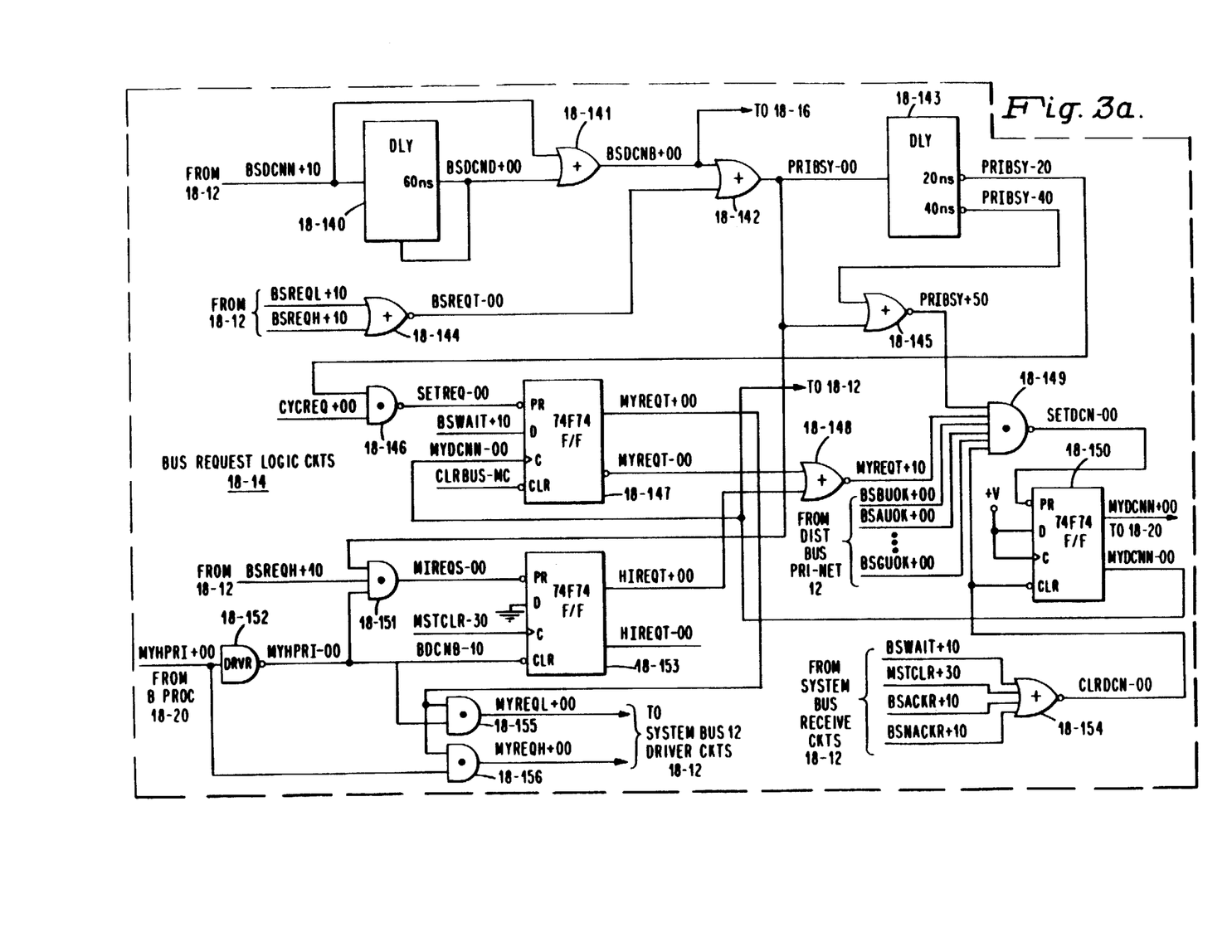
FIGS. 3a and 3b show in greater detail, the subsystem of FIG. 2.

FIG. 3a shows in greater detail, the distributed system priority network and bus request logic circuits of block 18-14. As shown, these circuits transmit and receive signals to and from asynchronous system bus network 12 via the driver and receiver circuits of block 18-12. One first such signal is bus data cycle now signal BSDCNN+10. This signal is passed through a 60 nanosecond delay line 18-140. The sixty (60) nanosecond period enables the highest priority requesting unit to utilize the next bus cycle without interference. At the same time, the receiving unit or slave uses this signal as a synchronizing signal.

The resulting output signal BSDCND+00 and signal BSDCNN+10 are logically combined in a first OR gate 18-141 which produces a strobe signal BSDCNB+00. This signal is used to clear the distributed priority network between system bus cycles. An OR gate 18-142 combines output signal data cycle now busy signal BSDCNB+00 with the high level and low level bus request signals BSREQH+00 and BSREQL+10 received as output bus request signal BSREQT-10 from a NOR gate 18-144 as shown.

The signal BSDCNB+00 filters out from the resulting output signal PRIBSY-00 any momentary glitches appearing on the bus request leads since signal BSDCNB+00 is high during the interval during which the signals applied to these leads change state. Thus, signal BSDCNB+00 bridges any hole occurring between successive user requests.

When signal BSREQT-00 switches from a binary ONE to a binary ZERO, it causes an OR gate 18-142 to force priority busy signal PRIBSY-00 to a binary ZERO in the absence of signal BSDCNB+00. Signal PRIBSY-00 remains a binary ZERO until signal BSDCNB+00 is forced to a binary ONE. The signal PRIBSY-00 defines when the distributed priority network of bus 12 switches from an idle state to a busy state. That is, print busy signal PRIBSY-00 is applied to a twenty (20) nanosecond delay line 18-143 which generates as outputs signals PRIBSY-20 and PRIBSY-40. The signal PRIBSY-20, when a binary ZERO, prevents the storage of any request generated by processor 18-20 during a priority network resolution cycle.

The signals PRIBSY-20 and PRIBSY-40 are combined within a NOR gate 18-145 to produce signal PRIBSY+50 which is applied as one input to a NAND gate 18-149 which determines whether or not subsystem 18 is to be granted access to system bus 12.

The series connected NAND gate 18-146, D-type grant flip-flop 18-147 and NOR gate 18-148 are used to generate my request signal MYREQT+10 in response to peripheral subsystem 18 requesting access to system bus 12 (i.e., signal CYCREQ+00=1). The my request signal MYREQT-00 is applied as one input to NOR gate 18-148 which receives as a second input, a high priority request signal HIREQT+00. In the absence of a high priority request (i.e., signal HIREQT+00=1), processor request signal MYREQT-00 causes NOR gate 18-148 to force request signal MYREQT+10 to a binary ONE. The NAND gate 18-149 also receives as inputs, the distribution priority network signals BSBUOK+00 through BSGUOK+00 which correspond to those of the subsystems positioned at higher priority positions on system bus 12. In the absence of any higher priority subsystem request, NAND gate 18-149 forces set data cycle now signal SETDCN-00, to a binary ZERO. This, in turn, forces my data cycle now D-type flip-flop 18-150, to a binary ONE. The receipt of any response from a system bus 12 causes a NOR gate 18-154 to generate a reset signal CLRDCN-00.

The NAND gate 18-151, driver circuit 18-152, and D-type flip-flop 18-153 are used to generate high priority request signal HIREQT+00 for indicating the presence of a high priority request signal, in response to signal HIREQS-00 generated in response to a high priority request from system bus 12. Signals MYHPRI+00, MYHPRI-00 and MYREQT+00 cause a pair of AND gates 18-155 and 18-156 to generate high and low priority request signals MYREQH+00 and MYREL+00. These signals are applied to system bus 12 via the driver circuits of block 18-12.

Figure 3B:
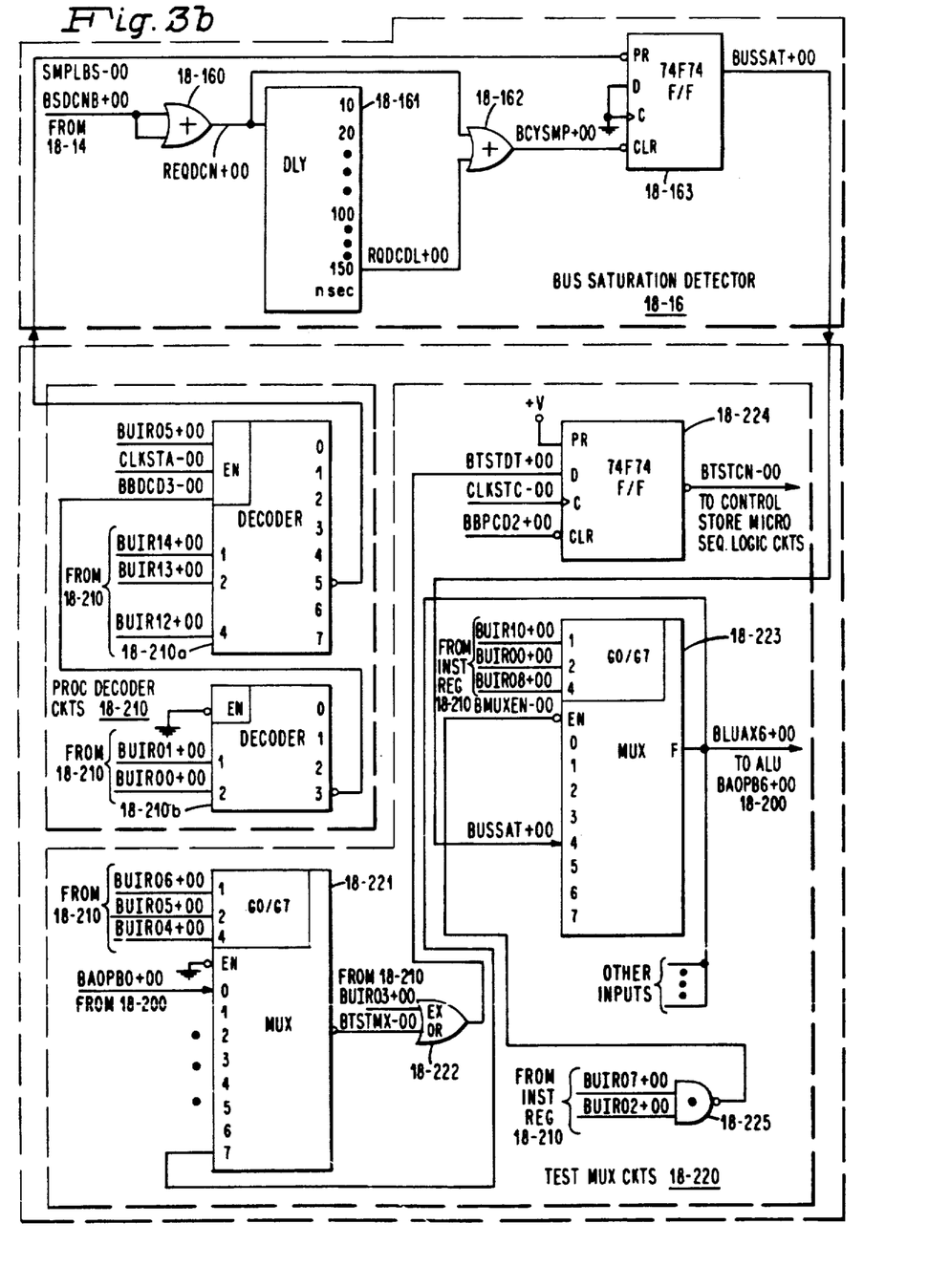

FIG. 3b shows in greater detail, the bus saturation detector 18-16. As shown, the detector receives bus data cycle now busy signal BSDCNB+00, from the circuits of block 18-14 which is applied to an OR gate 18-160. The resulting signal REQDCN+00 is applied to the input of a delay line 18-161 and to one input of an OR gate 18-162.

The signal REQDCN+00 is delayed by a predetermined amount and then applied as signal RQDCDL+00 as a second input to OR gate 18-162. The predetermined amount of delay is selected by measuring the delays incurred by bus data cycle now signal BSDCNN+10, and bus acknowledgement signal BSACKR+10 shown in FIG. 3a. The value is chosen so that the signal BCYSMP+00, produced by logically combining signals REQDCN+00 with RQDCDL+00 in an OR gate 18-162, remains constantly on during the period of time that system bus 12 is saturated. This value approximates 150 nanoseconds.

As seen from FIG. 3b, signal BCYSMP+00 is applied to the reset or clear input terminal of D-type bus saturation detector indicator flip-flop 18-162. The preset input is connected to receive a sample control signal SMPLBS-00 from processor 18-20. When forced to a binary ZERO, this signal switches flip-flop 18-162 to a binary ONE state. The binary ONE output signal BUSSAT+00 is applied as an input to one of the test condition multiplexer circuits of block 18-220.

Also, FIG. 3b shows in greater detail, certain processor decoder and test circuits. It is seen that the processor decoder circuits 18-210 include a pair of decoder circuits 18-210a and 18-210b which are used to decode specified fields of a microinstruction which results in the generation of sample control signal SMPLBS-00. The processor test condition multiplexer circuits of block 18-220 include a test condition multiplexer circuit 18-221 which, in response to one of the control fields of a test and branch type microinstruction of FIG. 4a, selects one of eight possible output conditions to select. The selected output condition signal BTSTMX-00 is compared by an exclusive OR gate 18-222, and the result is stored in a branch test enable D-type flip-flop 18-224. The output signal BTSTEN-00 is applied as an input to the processors's microsequencer logic circuits.

Figure 4A:
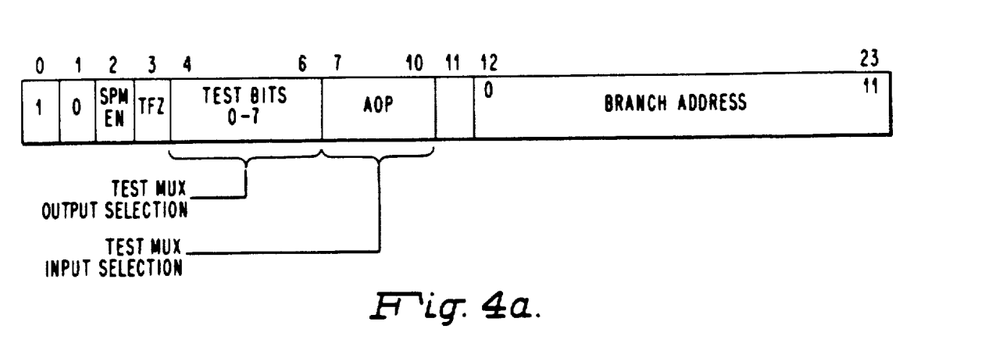
FIGS. 4a and 4b show the format of a microinstruction and arrangement of microinstructions included within the subsystem of FIG. 2.

One of the input signals whose state is tested by circuit 18-221 includes signal BUSSAT+00. As shown, this signal is applied as one of the inputs to a multiplexer circuit 18-223. Another field of the test and branch microinstruction of FIG. 4a is used to select which one of the test inputs will be selected for testing. The output of multiplexer circuit 18-223 which corresponds to signal BLUAX6+00 is also applied to the ALU as signal BAOPB6+00.

MICROINSTRUCTION FORMAT

FIG. 4a illustrates the format of the test and branch microinstruction used in conjunction with the present invention. Bits 0-1 are used to specify the type of microinstruction. These bits are "10" in the case of the test and branch microinstruction.

Bit 2 is a single bit field whose state specifies when the scratchpad memory is to be enabled. Bit 3 is a test field bit which is set to a ZERO value and used to test the state of a signal selected for testing. The bits 4-6 are a multiplexer test condition field. There are up to eight multiplexer circuit outputs which can be tested using TFZ bit 3. Bits 7-10 are an AOP field used in conjunction with bit 2 to select which input to the multiplexer circuits is to be tested. Must be zero (MBZ) bit 11 is set to ZERO. Bits 12-23 are an 12-bit branch address which is used as a next address when the condition being tested is true.

DESCRIPTION OF OPERATION

With specific reference to the flow chart of FIG. 5, the method and operation of the bus saturation detector apparatus of the present invention will now be described with reference to FIGS. 1 through 3b and 4a. Initially, the peripheral subsystem will be configured or initialized to operate at maximum efficiency or performance. For example, it is assumed that it will be operating as a high priority device established by the setting of a register bit.

In this example, processor 18-20 issues successive memory read requests, each coded to specify a burst transfer. In response to each such request, memory subsystem 16 transfers a number of double words of data over a number of successive bus cycles in that, memory subsystem 16 has the highest priority access. This type of operation is most likely to result in the saturation of system bus 12. While the arrangement of U.S. Pat. No. 4,558,429 can to some extent alleviate this condition relative to certain types of transfers, saturation may none the less occur when several high speed units are also being operated at maximum efficiency.

The method and apparatus of the present invention, by providing the subsystem with the ability to limit bus access, it enables such units to operate in a more equitable, cooperative manner when bus saturation occurs.

The peripheral subsystem 18-20 operates on recognizable units of data, such a data block which includes 256 bytes of information. This unit of data corresponds to the amount of data stored within a sector of a disk. In the system of FIG. 1, memory subsystem 14 when operated in a burst mode is capable of transferring up to eight double words or 32 bytes of information in response to a single disk controller read request. A number of such requests are required to complete the transfer of a block. Normally, disk subsystem 18 requires the transfer of several such blocks for efficient operation. Accordingly, information pertaining to the number of blocks to be transferred will be stored in scratchpad memory and accessed by processor 18-20 during the transfer operation.

Also, the disk peripheral subsystem processor 18-20 determines the number of requests which are to be successively issued in order to obtain each block of data. In the present system, this number, which corresponds to eight, is used as a bus cycle count and is stored in a scratchpad register location. Another value called "wait count" is used to establish the wait duration or time interval between the issuance of successive requests by subsystem 18. In the present example, it is assumed that each count corresponds to a fixed delay. This delay can be easily adjusted as required.

Figure 5:
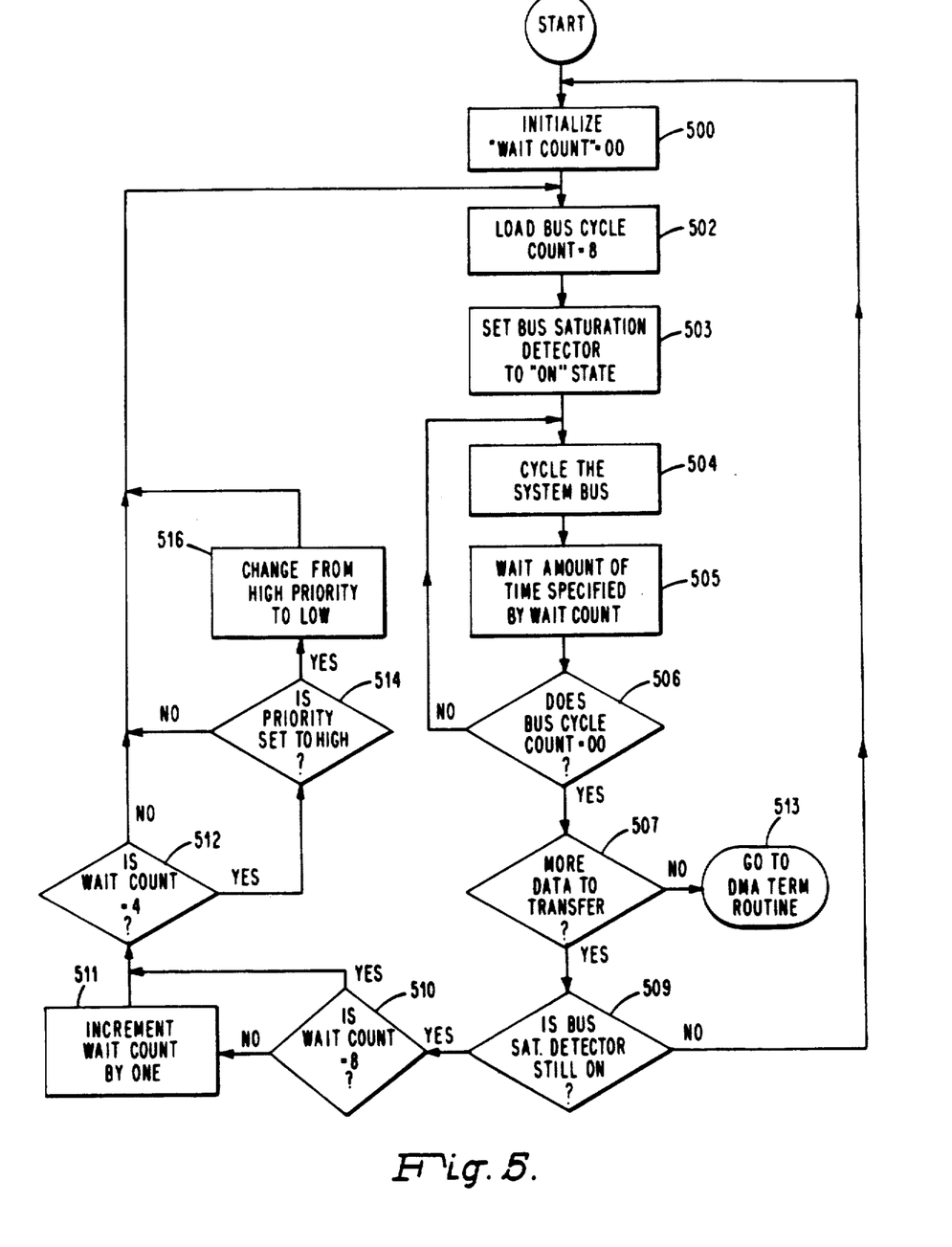
FIG. 5 is a flow chart used to explain the operation of the present invention.

Referring to FIG. 5, it is seen that processor 18-20, under control of the bus saturation routine of FIG. 4a, first initializes the "wait count" to zero as shown in block 500. The "wait count" value is then stored in a predetermined register location in scratchpad memory. Next, processor 18-20 loads the bus count of eight into the bus cycle register location of scratchpad memory which completes block 502.

Under microinstruction control, processor 18-20 performs block 503 by causing the decoder circuits 18-210 of FIG. 3c to force sample signal SMPLBS-00 to a binary ZERO. This, in turn, sets the bus saturation detector indicator flip-flop 18-162 to a binary ONE state. As indicated in block 504, processor 18-20 generates a bus cycle request (i.e., signal CYCREQ+00=1) for transferring the first memory read request coded to specify a burst type transfer. This type of request is specified by switching certain bus command line signals (i.e., BSDBPL, BSDBWD, BSWRIT) to the proper states. Signal CYCREQ+00, generated by processor 18-20, in the presence of bus idle signal PRIBSY-00, allows my request flip-flop 18-147 of FIG. 3a to be switched to a binary ONE. Also, the processor 18-20 forces high priority request signal MYHPRI+00 to a binary ONE. This, in turn, causes AND gate 18-156 of FIG. 3a to switch high priority request signal MYREQH+00 to a binary ONE. At the same time, signal MYHPRI+00 inhibits the switching of the high priority user flip-flop 18-153.

When peripheral subsystem 18 is granted access to system bus 12, NAND gate 18-149 switches set data cycle now signal SETDCN-00 to a binary ZERO. This, in turn, switches my data cycle, now flip-flop 18-150, to a binary ONE state. Signal MYDCNN+00 is used to gate the first burst read request onto system bus 12. The flip-flop 18-150 is reset to a binary ZERO state upon receipt of an acknowledgement signal BSACKR+10 from memory subsystem 14. Thereafter, memory subsystem 14 operates to transfer the 32 bytes of data over eight successive bus cycles of operation. At the completion of the transfer, processor 18-20 decrements by one, the bus cycle count. This completes the operations of block 504 of FIG. 5.

Since the "wait count" has a value of zero, there is no delay incurred in issuing the next burst read request to memory subsystem 14. However, before issuing the request, processor 18-20 checks the bus cycle count as shown in block 506. Since the bus cycle count does not equal zero, the processor 18-20 repeats the sequence of blocks 504 and 505 as described above. After eight successive read requests have been issued by processor 18-20, the bus cycle count will have been decremented to zero signaling the completion of the transfer of an entire block of information.

As seen from FIG. 5, when processor 18-20 performs the testing of the bus cycle count of block 506, a zero count causes processor 18-20 to sequence to block 507. Since there are more data blocks to transfer, the result of testing in block 507 causes processor 18-20 to sequence to block 509.

At this time, under the control of a microinstruction, having the format shown in FIG. 4a, processor 18-20 tests the state of the bus saturation detector indicator 18-162 of FIG. 3b. Such testing proceeds via the multiplexer circuits 18-221 and 18-223, exclusive OR circuit 18-222 of FIG. 3b, under the control of the TFZ and TESTBITS fields of the microinstruction of FIG. 4a. Assuming that the block transfer caused the saturation of system bus 12, signal BSDCNB+00 remains in a high state during the entire time interval that the block transfer was taking place. That is, during this time interval, the detector detected any presence of no unused or available cycles.

As seen from FIG. 5, the fact that bus saturation signal BUSSAT+00 is a binary ONE switches branch test flip-flop 18-224 of FIG. 3b to a binary ONE. The output signal BTSTCN-00 causes the processor microsequencer logic circuits of FIG. 2 to transfer the branch address contained in the microinstruction as the next address. The result of the testing in block 509 causes processor 18-20 to sequence to block 510. Processor 18-20 again reads out the "wait count" register location from scratchpad memory and increments it by one. Since this is the first time the wait count will be incremented, the results of testing in block 510 causes processor 18-20 to sequence to block 511 causing the "wait count" to be incremented by one. The testing by block 512 causes the processor 18-20 to sequence to block 502. After loading the bus cycle count value, processor 18-20 again generates signal SMPLBS-00 which sets the bus saturation detector indicator flip-flop 18-162 to a binary ONE.

In the same manner as described above, processor 18-20 issues a second sequence of burst read requests to memory subsystem 14. However, the processor 18-20 now waits twice as long before issuing each successive read request. This has the effect of throttling down the subsystem so that it receives 32 byte bursts of data at a rate which approximates one-half of the original transfer rate. Upon completing the transfer of a second block of 256 bytes, processor 18-20 again determines if more information is to be transferred.

As seen from FIG. 5, upon determining that still more blocks of information are to be transferred under the control of block 507, processor 18-20 again sequences to block 507. Processor 18-20 again tests the state of the saturation detector indicator flip-flop 18-162. If the state of the indicator flip-flop 18-162 has been switched to a binary ZERO, this indicates that by throttling down the subsystem's operation, bus saturation has been eliminated. It then resumes transfer at the maximum rate.

If block 509 determines that system bus 12 is still saturated, processor 18-20 again increments the "wait count" by one. This further lengthens the time between issuing read requests which further throttles down the rate at which the data bursts are being transferred. The throttling action continues as long as system bus 12 remains saturated. At some established point, processor 18-20 makes a further adjustment in rate by altering the subsystem's priority. As seen from FIG. 5, this point is specified by a "wait count" of 4. At that time, processor 18-20 tests to determine the bus priority access setting. If it is set to a high priority, processor 18-20 switches the priority from high to low as indicated by block 516 of FIG. 5. By being able to adjust the subsystem priority, this allows greater flexibility in adjusting the rate at which data bursts are being transferred by memory subsystem 14 to subsystem 18.

Figure 4B:
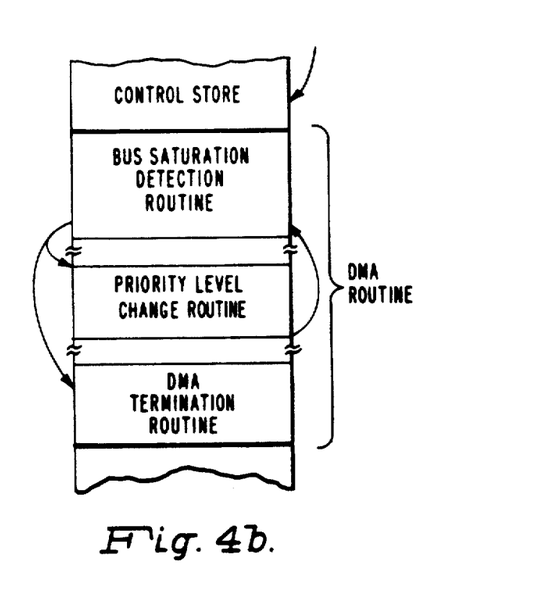

As seen from FIG. 5, processor 18-20 continues to lengthen the time between successive read requests as long as the bus continues to be saturated until a minimum level of performance is reached. This minimum level is established as the point where the "wait count" reaches a maximum count of eight. When this count value is reached, no further incrementing takes place and the transfer of data blocks continues at this level. Alternatively, processor 18-20 could be programmed to terminate the transfer by entering the DMA termination routine of FIG. 4b. In this case, the subsystem 18 would retry the operation at a later time. However, assuming operation continues, when block 507 detects that the required number of blocks have been transferred, processor 18-20 exits the bus saturation routine and begins the execution of the DMA termination routine of FIG. 4b.

It will be appreciated that many changes may be made to the order in which the different operations of the blocks of FIG. 5 are performed. Also, changes in bus cycle count and "wait count" values may be made as required to provide the desired results.

Because of its simplicity and ease of installation, the bus saturation detector apparatus of the present invention can be distributed among the different user subsystems enabling each user subsystem to be able to detect at any given time when the system bus 12 is in a saturated state.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. Bus saturation apparatus for detecting saturation on an asynchronous bus network coupled in common to a plurality of data handling units during the asynchronous transfer of data between different ones of said units during bus cycles of operation granted on a priority basis controlled by a priority network included as part of said bus network, said priority network being distributed to each of said plurality of units, said bus saturation apparatus being included in at least one of said units, said apparatus comprising:

means coupled to said bus network for monitoring the state of a predetermined one of a number of lines of said bus network indicative of bus activity; and, bistate indicator means coupled to said monitoring means, said indicator means being set to a predetermined state at a start of a data transfer interval by said one unit and said bistate indicator means being switched to another state by said monitoring means when said monitoring means detects that said bus network is not being saturated.

2. The apparatus of claim 1 wherein said monitoring means includes means for detecting an occurrence of an unused bus cycle of operation.

3. The apparatus of claim 2 wherein said monitoring means includes delay circuit means coupled to said predetermined one of said number of lines, said delay circuit means delaying signals received from said predetermined one of said lines by an amount corresponding to a normal interval between successively granted bus cycles for maintaining said indicator means in said predetermined state enabling detection of said unused bus cycle of operation.

4. The apparatus of claim 1 wherein said indicator means has an input and an output, said one unit including processor means coupled to said input and said output, said processor means applying a signal to said input at said start of said data transfer interval for switching said indicator means to said predetermined state and said processor means generating signals at a completion of said data transfer interval to test the state of said indicator means.

5. The apparatus of claim 4 wherein said predetermined one of said lines receives signals corresponding to bus data cycle now signals indicating when data cycles are taking place on said bus network.

6. The apparatus of claim 3 wherein said processor means generates signals for repeatedly setting said indicator means to said predetermined state prior to said start of each successive data transfer interval and testing said indicator means at said completion of said each data transfer interval for determining if said processor means had caused bus saturation during a previous data transfer interval.

7. The apparatus of claim 6 wherein said processor means includes microprogrammed control means for storing sequences of microinstructions for controlling the transfer of data between said unit and said bus network, said sequences including test and branch microinstructions, each including a branch address and first and second fields coded to specify said testing of said state of indicator means, and said processor means upon determining that said indicator means is in said predetermined state branching to a sequence of microinstructions specified by said branch address for throttling down said transfer of data between said unit and said bus network.

8. The apparatus of claim 7 wherein said unit further includes bus request means coupled to said processing means for generating requests for accessing said bus network for transferring data between said unit and said bus network, said processor means in response to said sequence of microinstructions delaying said generating of each request by a predetermined amount so as to reduce an amount of data being transferred between said unit and said bus network for said throttling down said transfer of data.

9. The apparatus of claim 8 wherein each said request is coded to specify a burst type of operation in which said processor means transfers a successive number of byte groups of data over said bus network during a corresponding number of allocated bus cycles of operation.

10. The apparatus of claim 8 wherein said predetermined amount of delay is defined by a wait count value stored by said processor means, said processor means incrementing said wait count by one each time said indicator means is detected to be in said predetermined state following said data transfer interval and said processor means continuing said throttling down said transfer of data by causing said bus request means to increase said delaying said generating of each said request until said indicator means is detected to have switched from said predetermined state to said another state.

11. The apparatus of claim 10 wherein said bus request means includes means for specifying the priority of said requests being generated, said processor means upon incrementing said wait count value to a predetermined value switching said means for specifying said priority from a high to a low priority further throttling down said transfer of data.

12. The apparatus of claim 10 wherein said processor means upon detecting that said indicator means has switched to said another state resets said wait count value to zeros enabling said transfer of data to be resumed at a maximum rate.

13. A peripheral controller for controlling the high speed transfer of data from at least one input/output device to and from an asynchronous bus network which connects said controller common with a plurality of data handling units for asynchronously transferring data between different ones of said units during bus cycles of operation granted on a priority basis controlled by a priority network included as part of said bus network, said priority network being distributed to each of said plurality of units, said controller comprising:

a bus saturation detector coupled to said bus network, said detector including:

means coupled to said bus network for monitoring the state of a predetermined one of a number of lines of said bus network indicative of bus activity; and, a bistable indicator coupled to said monitoring means, said bistable indicator being switched from a first state to a second state by said monitoring means when said monitoring means detects that said bus network is not being saturated; and, processor means for generating signals for transferring blocks of data between said input/output device and said bus network, said processor means being coupled to said bus saturation detector, said processor means setting said indicator to said first state at a start of a data transfer operation interval and said processor means including means for testing said state of said indicator at a completion of said data transfer operation interval.

14. The controller of claim 13 wherein said monitoring means includes means for detecting an occurrence of an unused bus cycle of operation.

15. The controller of claim 14 wherein said monitoring means includes delay circuit means coupled to said predetermined one of said number of lines, said delay circuit means delaying signals received from said predetermined one of said lines by an amount corresponding to a normal interval between successively granted bus cycles for maintaining said indicator in said first state enabling detection of said unused bus cycle of operation.

16. The controller of claim 15 wherein said predetermined one of said lines receives signals corresponding to bus data cycle now signals indicating when data cycles are taking place on said bus network.

17. The controller of claim 13 wherein said processor means generates signals for repeatedly setting said indicator to said first state prior to said start of each successive data transfer operation interval and testing said indicator means at said completion of said each data transfer operation interval for determining if said processor means had caused said bus network to saturate during a previous data transfer operation interval.

18. The controller of claim 17 wherein said processor means includes microprogrammed control means for storing sequences of microinstructions for controlling the transfer of data between said input/output device and said bus network, said sequences including test and branch microinstructions, each including a branch address and first and second fields coded to specify said testing of said state of indicator, and said processor means upon determining that said indicator means is in said first state branching to a sequence of microinstructions specified by said branch address for throttling down said transfer of data between said device and said bus network.

19. The controller of claim 18 wherein said controller further includes bus request means coupled to said processing means for generating requests for accessing said bus network for transferring data between said device and said bus network, said processor means in response to said sequence of microinstructions delaying said generating of each request by a predetermined amount so as to reduce an amount of data being transferred between said device and said bus network for said throttling down said transfer of data.

20. The controller of claim 19 wherein each said request is coded to specify a burst type of operation in which said processor means transfers a successive number of byte groups of data over said bus network during a corresponding number of allocated bus cycles of operation.

21. The controller of claim 19 wherein said predetermined amount of delay is defined by a wait count value stored by said processor means, said processor means incrementing said wait count by one each time said indicator is detected by testing to be in said first state following said data transfer operation interval and said processor means continuing said throttling down said transfer of data by causing said bus request means to increase said delaying said generating of each said request until said indicator means is detected to have switched from said first state to said second state or until said wait count has reached a predetermined maximum value.

22. The controller of claim 21 wherein said bus request means includes means for specifying the priority of said requests being generated, said processor means upon incrementing said wait count value to a predetermined value switching said means for specifying said priority from a high to a low priority further throttling down said transfer of data.

23. The controller of claim 21 wherein said processor means upon detecting that said indicator has switched to said second state resets said wait count value to zeros enabling said controller to resume said transfer of data at a maximum rate.

24. A method of preventing the saturation of an asynchronous bus network coupled in common to a plurality of data handling units in which data is asynchronously transferred between different ones of said units during bus cycles of operation granted on a priority basis controlled by a priority network included as part of said bus network, said priority network being distributed to each of said plurality of units, said method comprising the steps of:

including as part of a bus interface of each of a number of said units, a bus saturation detector circuit;

monitoring bus cycle activity by connecting an input of said bus saturation detector to a predetermined line of said bus network;

setting said detector circuit to a first state at the start of a data transfer by a processor included in said each of a number of units;

switching said detector circuit from said first state to a second state when said detector circuit detects an occurrence of an unused bus cycle;

testing the state of said detector circuit at the end of said data transfer interval by said processor for determining if said bus network is being saturated; and, throttling down the rate at which data is being transferred by said processor in a predetermined manner when the state of said detector circuit indicates that said bus network is saturated until said bus network is no longer being saturated.

* * * * *